F. E. HAMILTON.
CERTIFICATE.
APPLICATION FILED JUNE 12, 1920.
1,429,423.
Patented Sept. 19, 1922.
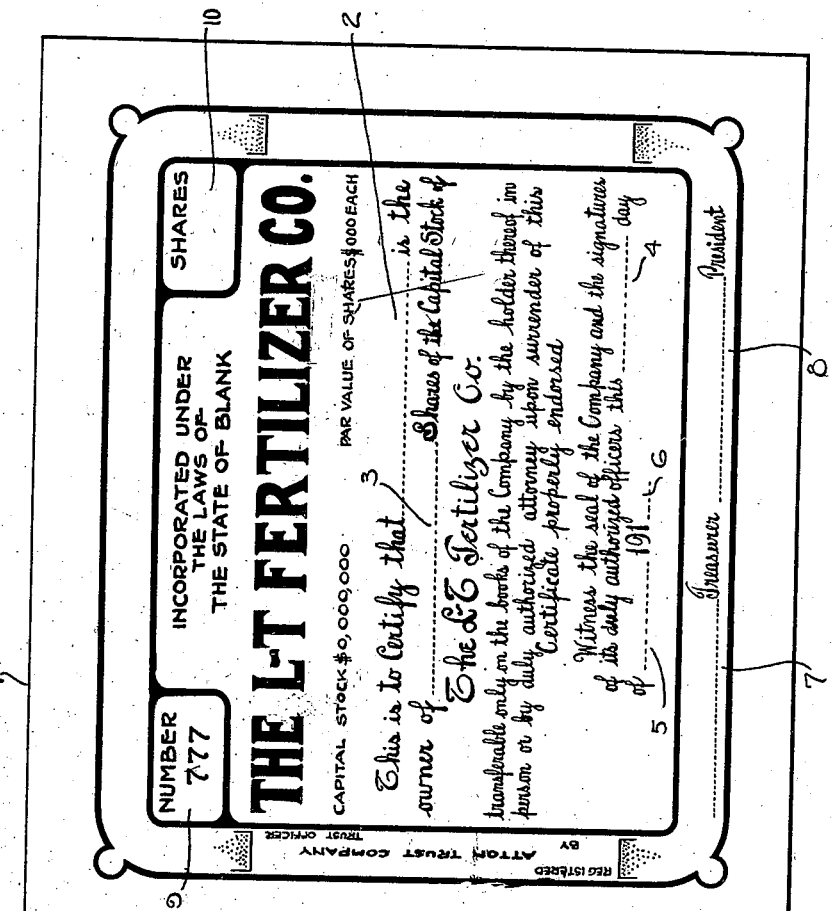
INVENTOR
Francis E. Hamilton
BY
Thomas Howe
ATTORNEY Patented Sept. 19, 1922.

1,429,423

UNITED STATES PATENT OFFICE.

FRANCIS E. HAMILTON, OF NEW YORK, N. Y.

CERTIFICATE.

Application filed June 12, 1920. Serial No. 388,402.

*To all whom it may concern:*

Be it known that I, FRANCIS E. HAMILTON, a citizen of the United States of America, residing at city, county, and State of New York, have invented new and useful Improvements in Certificates, of which the following is a specification.

This invention relates to certificates of ownership in enterprises which may be of widely varying character and objects.

For a great variety of reasons it has been found advantageous to organize enterprises into corporations in which shares of stock are sold and the corporation is owned by the holders of the stock. As evidence of this ownership certificates are issued to the stockholders and this evidence of ownership of shares of stock or portions of the corporation may be transferred by delivery; if necessary, accompanied by a proper endorsement and appropriate adjustment of the books of the corporation.

While the corporation has many advantages as a medium for the transaction of business it is subject to the disadvantage that a stockholder in a corporation has merely a right to participate in the management of the corporation so far as he is permitted by the laws of the State and the by-laws of the corporation and receive his share of the dividends. He does not own any of the effects of the corporation and consequently has no right to appropriate them to his own use. He cannot, therefore, avail himself of the low prices of a corporation's commodities but must buy them of the corporation as they would be bought by a stranger, paying the full price including the profit of the corporation. This may be contrasted with the case where a person as an individual engages in an enterprise. He not only obtains the profit from the sale of commodities, but inasmuch as he is entitled to all of the things which he owns he may appropriate them to his own use instead of selling them to others and thus he will obtain the goods for his own use at the low price commanded by the business. Thus if the concern is manufacturing the goods he can obtain them at cost price and if they are bought from others he will have the benefit of the wholesale price.

It is the main object of the present invention to provide an instrumentality whereby at the time evidence of the ownership of a person of a share in a corporation or other enterprise is delivered to him, he will also receive combined therewith, evidence of his right to a portion of the price of goods purchased by him from the corporation. In this way one of the disadvantages, as referred to above, of ownership in corporations as distinguished from private ownership is avoided. To this end there is provided a certificate having a body portion and a coupon constituting together a complete certificate of interest in an enterprise, including the certification of ownership of a share in the enterprise and the right to obtain the products of the concern at a discount. When a person acquires ownership of a share in the enterprise, his right to the discount attaches and he receives evidence of his share ownership and discount right simultaneously, the whole evidencing the complete right including the condition precedent to the discount right, namely, share ownership, and the evidence of the discount right itself, while the body portion alone is a certificate of share ownership.

While the invention is most generally useful in connection with corporations, it is not limited to such use but may be availed of in connection with enterprises of different organizations.

Other and ancillary objects of the invention will appear hereinafter.

The accompanying drawing, which illustrates the invention, is a face view of a certificate embodying the invention.

Referring to the drawing, the body portion 1 consists of a sheet of paper or other suitable material which bears matter certifying that a certain person is the owner of shares of stock in a named corporation, spaces being provided at appropriate points for the said owner at 2, the number of shares at 3, the date at 4, 5 and 6 and signatures of proper officers of the corporation at 7 and 8. Also spaces are provided at 9 for the number of the certificate and at 10 for the numerical designation of the number of shares. It is believed that this body portion will be fully understood from the foregoing description, taken with the notations on the drawing, so that no further reference to the details is necessary.

Attached to the body portion, usually forming a part of the same sheet, are a plurality of coupons 11, 12, 13 and 14 each being evidence, in connection with the body portion, of the right of the owner to obtain goods from the corporation at a discount. At the time of making each purchase a coupon may be detached so that the corporation may have a record of the transaction. The matter on each coupon is evident from the drawing so that further reference thereto is unnecessary.

While the invention has been illustrated in what is considered its best application, it will be apparent that the structure shown may be variously modified without departing from the spirit of the invention which is not therefore limited to the structure shown in the drawing.

What I claim is:

A certificate comprising a body portion and a coupon, said body portion and coupon bearing indications to constitute together a certificate of ownership of interest in an enterprise, said interest consisting of ownership of a share in said enterprise and a right to a portion of the price of goods sold by said enterprise to the holder of said certificate, said body portion alone constituting a certificate of ownership of a share in said enterprise only.

In testimony whereof I have signed this specification this 10th day of June, 1920.

FRANCIS E. HAMILTON.